US012547097B2

(12) United States Patent
Ahn et al.

(10) Patent No.: US 12,547,097 B2
(45) Date of Patent: Feb. 10, 2026

(54) TONER CARTRIDGE WITH WASTE TONER DISPERSING MEMBER CONNECTED TO AND DRIVEN BY TONER TRANSPORT MEMBER

(71) Applicant: Hewlett-Packard Development Company, L.P., Spring, TX (US)

(72) Inventors: Yongnam Ahn, Seongnam Si (KR); Jiwon Moon, Seongnam Si (KR); Woongyong Choi, Seongnam Si (KR); Minsu Han, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/854,953

(22) PCT Filed: Sep. 27, 2022

(86) PCT No.: PCT/US2022/044808
§ 371 (c)(1),
(2) Date: Oct. 7, 2024

(87) PCT Pub. No.: WO2023/211480
PCT Pub. Date: Nov. 2, 2023

(65) Prior Publication Data

US 2025/0251679 A1 Aug. 7, 2025

(30) Foreign Application Priority Data

Apr. 27, 2022 (KR) ........................ 10-2022-0051921

(51) Int. Cl.

| | |
|---|---|
| ***G03G 15/08*** | (2006.01) |
| ***G03G 21/10*** | (2006.01) |
| ***G03G 21/12*** | (2006.01) |

(52) U.S. Cl.
CPC ..... *G03G 15/0844* (2013.01); *G03G 15/0865* (2013.01); *G03G 15/0868* (2013.01);
(Continued)

(58) Field of Classification Search
CPC ........... G03G 15/0844; G03G 15/0865; G03G 15/0889; G03G 15/0891; G03G 21/12;
(Continued)

(56) References Cited

U.S. PATENT DOCUMENTS 5,260,750 A * 11/1993 Ishida .................... G03G 21/12 399/262
5,440,376 A * 8/1995 Hagihara ........... G03G 15/0844 399/262

(Continued)

FOREIGN PATENT DOCUMENTS

JP 2004029596 A * 1/2004
JP 2006-154259 A 6/2006

*Primary Examiner* — Stephanie E Bloss
*Assistant Examiner* — Laura Roth
(74) *Attorney, Agent, or Firm* — Foley & Lardner LLP

(57) ABSTRACT

An example toner cartridge includes a toner container to contain toner, the toner container including a toner outlet, a toner transport member arranged in the toner container to transport the toner to the toner outlet by rotating with respect to a rotation shaft in a first direction, and a waste toner container including a waste toner inlet to receive waste toner, the waste toner inlet arranged in a side portion of the toner container in the first direction. A dispersing member to transport the waste toner in the second direction and disperse the waste toner therein may be arranged in the waste toner container. A driving transfer member may receive rotation power from the toner transport member to drive the dispersing member.

11 Claims, 12 Drawing Sheets

(52) U.S. Cl.
CPC ..... *G03G 15/0889* (2013.01); *G03G 15/0891* (2013.01); *G03G 21/10* (2013.01); *G03G 21/12* (2013.01); *G03G 15/0872* (2013.01); *G03G 2215/0685* (2013.01); *G03G 2215/0827* (2013.01); *G03G 2221/1624* (2013.01)

(58) Field of Classification Search
CPC ... G03G 2215/0827; G03G 2215/0668; G03G 15/0868; G03G 15/0872; G03G 15/0875; G03G 21/10; G03G 2215/0685; G03G 2221/1624
See application file for complete search history.

(56) References Cited

U.S. PATENT DOCUMENTS

| | | | | |
|---|---|---|---|---|
| 2002/0064395 | A1* | 5/2002 | Funayama ......... | G03G 15/0855 399/120 |
| 2005/0220498 | A1* | 10/2005 | Ito ...................... | G03G 15/0875 399/262 |
| 2007/0147918 | A1 | 6/2007 | Kim et al. | |
| 2010/0111571 | A1* | 5/2010 | Koido ................ | G03G 15/0898 399/254 |
| 2012/0237230 | A1 | 9/2012 | Karasawa et al. | |
| 2015/0139690 | A1* | 5/2015 | Kim ..................... | G03G 21/185 399/253 |
| 2022/0011715 | A1 | 1/2022 | Oh et al. | |

* cited by examiner

TONER CARTRIDGE WITH WASTE TONER DISPERSING MEMBER CONNECTED TO AND DRIVEN BY TONER TRANSPORT MEMBER

CROSS-REFERENCE TO RELATED APPLICATIONS

This application is a US National Stage Entry under 35 U.S.C. § 371 of International Application No.: PCT/US2022/044808 filed Sep. 27, 2022, which claims priority to Korean Patent Application No. 10-2022-0051921, filed Apr. 27, 2022, which are hereby incorporated by reference in their entireties.

BACKGROUND

An electrophotographic image forming apparatus supplies toner contained in a developing device to an electrostatic latent image formed on a photoconductor to form a visible toner image on the photoconductor, transfers the toner image to a print medium, and fuses the transferred toner image onto the print medium. The toner may be supplied from a toner cartridge to the developing device, and waste toner discharged from the developing device in an image forming process may be contained in a waste toner container. The waste toner container may be formed integrally with the toner cartridge. Based on the toner contained in a toner container being consumed or the waste toner container being full with the waste toner, the toner cartridge may be removed from a main body of the image forming apparatus to be replaced with a new toner cartridge.

BRIEF DESCRIPTION OF THE DRAWINGS

Various examples will be described below by referring to the following figures.

DETAILED DESCRIPTION

Figure 1:
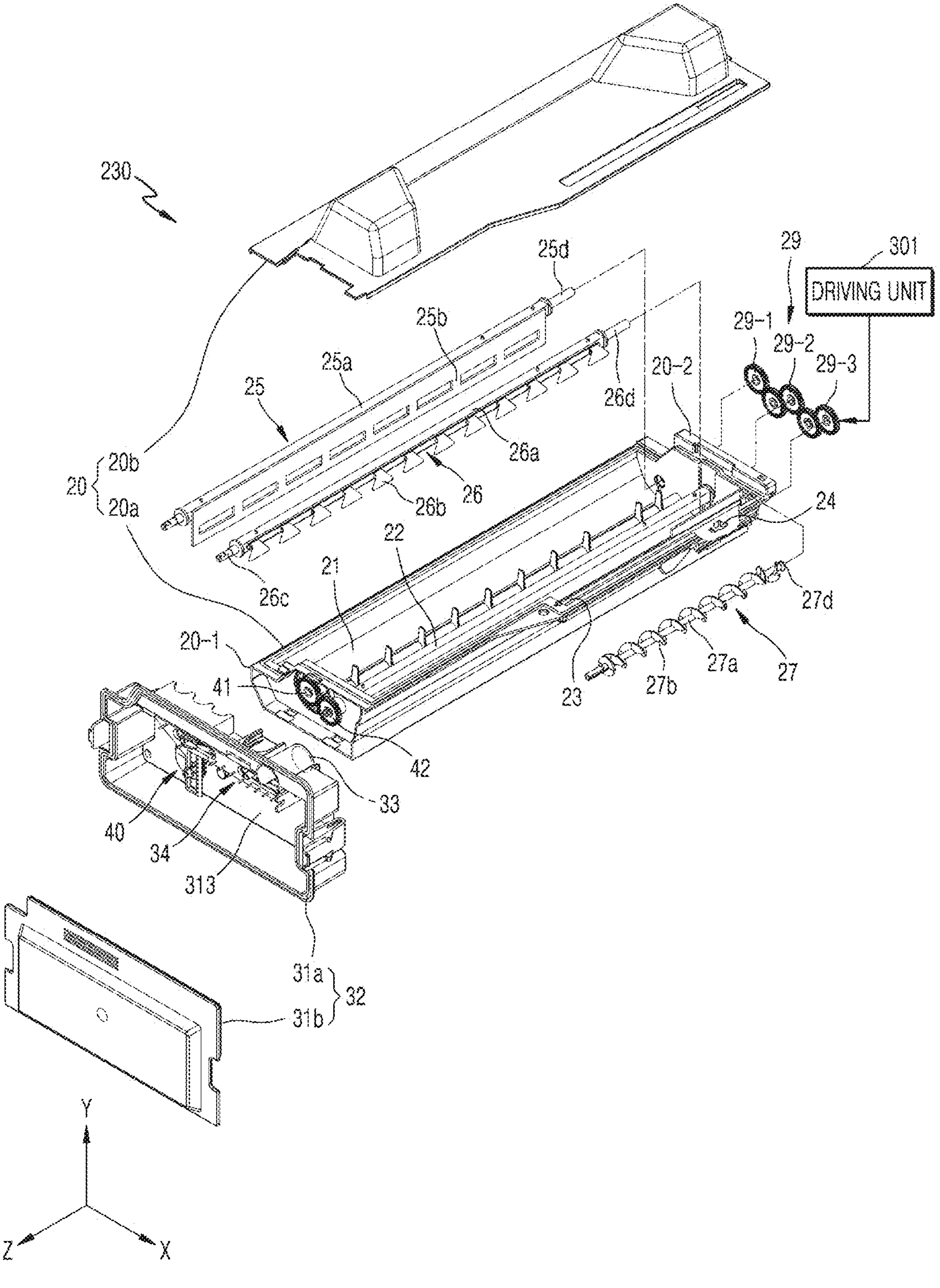
FIG. 1 is a schematic exploded perspective view of a toner cartridge according to an example.

An electrophotographic image forming apparatus may include a toner cartridge including a toner container and a waste toner container. Toner contained in the toner container may be supplied to a developing device. In an image forming process, waste toner may be discharged from the developing device. For example, after a toner image formed on a photoconductive drum (e.g., a photoconductor) is transferred to a print medium, toner may remain on the photoconductive drum. Before a next toner image is formed, the toner (i.e., the waste toner) remaining on the photoconductive drum is removed. The waste toner may be contained in the waste toner container. An inlet may be provided in the waste toner container to receive the waste toner. The waste toner may drop from the inlet to the bottom of the waste toner container. In that case, the waste toner is mainly accumulated in a lower portion of the inlet. To improve waste toner containing efficiency of the waste toner container, the inlet may be located as far as possible from the bottom of the waste toner container. However, an installation position of a waste toner inlet may be limited due to a layout of an inner space of the image forming apparatus, an attempt to miniaturize the image forming apparatus, etc. A dispersing member located inside the waste toner container to disperse the waste toner may be employed. A driving force for driving the dispersing member may be provided from a main body, but to this end, an additional driving source and a driving structure should be provided in the main body.

By providing rotation power of a toner transport member that transports the toner inside the toner container to a toner outlet, the driving structure for driving the dispersing member may be simplified. A toner cartridge according to an example may include a toner container and a waste toner container located in a side portion of the toner container in a first direction. In the toner container, a toner transport member may be disposed, which is to transport the toner in a second direction while rotating about a rotation shaft in the first direction to supply the toner to the toner outlet. In the waste toner container, a dispersing member may be disposed, which is to transport the waste toner in the second direction and disperse the waste toner therein. A driving transfer member may receive rotation power from the toner transport member to drive the dispersing member. In the main body of the image forming apparatus, a separate driving source for driving the dispersing member and a separate power connection structure for connecting the driving source to the dispersing member based on the toner cartridge being mounted on the main body may be omitted, thereby reducing material costs of the toner cartridge and the image forming apparatus. Moreover, by dispersing the waste toner inside the waste toner container, the waste toner containing efficiency of the waste toner container may be improved.

The driving transfer member may reciprocate the dispersing member in the second direction. As the dispersing member reciprocates in the second direction, the waste toner may be dispersed inside the waste toner container. A driving transfer member of various structures for driving the dispersing member in the second direction may be used. An example of the toner cartridge may include a vibration driving unit that vibrates the dispersing member in the first direction in conjunction with the reciprocation of the dispersing member in the second direction. As the waste toner is dispersed by the vibration driving unit in the first direction, the waste toner containing efficiency of the waste toner container may be improved. The dispersing member may be an auger including a rotation shaft in the second direction and spiral wings formed in the rotation shaft. The driving transfer member may rotate the auger. The auger may transport the waste toner in the second direction to disperse the waste toner inside the waste toner container. The toner container may include a first side portion that is a non-driving side portion and a second side portion that is a driving side portion. In the second side portion may be provided a follower connected to a driving unit of the main body of the image forming apparatus to drive the toner transport member. The waste toner container may be disposed in the first side portion of the toner container.

An example of an image forming apparatus may include a main body including a developing device to supply toner to an electrostatic latent image formed on a photoconductor to develop the electrostatic latent image, and the toner cartridge that is attachable to and detachable from the main body in a first direction and contains toner to be supplied to the developing device and waste toner discharged from the developing device. Hereinbelow, with reference to the accompanying drawings, examples of the toner cartridge and the electrophotographic image forming apparatus employing the toner cartridge will be described. In the following description, components having substantially the same functional configurations in the present specification and drawings will be referred to as the same reference numerals to omit redundant description.

FIG. 1 is a schematic exploded perspective view of a toner cartridge 230 according to an example. Referring to FIG. 1, the toner cartridge 230 may include a toner container 20 and a waste toner container 32. In the toner container 20, at least one toner transport member, e.g., toner transport members 25, 26, and 27 may be provided. A dispersing member 34 may be provided in the waste toner container 32. A driving transfer member 40 may receive rotation power from one of the toner transport members 25, 26, and 27 to drive the dispersing member 34.

Toner to be supplied to a developing device (e.g., 10 of FIG. 12 described below) may be contained in the toner container 20. For example, the toner container 20 may be formed by a lower housing **20*a* and an upper housing 20*b* coupled in a third direction (e.g., a vertical direction) Y. The inner space of the toner container 20 may include first and second toner containers 21 and 22 located in a second direction (e.g., a horizontal direction) X and a toner discharging unit 23. A toner outlet 24 may be provided in the toner discharging unit 23. The toner transport members 25, 26, and 27 may transport the toner in the toner container 20 to the toner outlet 24. The toner transport members 25 and 26 may be provided in the first toner container 21 and the second toner container 22, respectively. The toner transport member 27 may be provided in the toner discharging unit 23. The toner transport members 25, 26, and 27 may transport the toner in the first direction Z and the second direction X. The toner transport member 25 may include a rotation shaft 25*a* extending in the first direction Z and a transport wing 25*b* extending from the rotation shaft 25*a* in a radial direction. The toner transport member 26 may include a rotation shaft 26*a* extending in the first direction Z and a transport wing 26*b* extending from the rotation shaft 26*a* in the radial direction. The toner transport member 27 may transport the toner in the toner discharging unit 23 in the first direction Z. The toner transport member 27 may include a rotation shaft 27*a* extending in the first direction Z and a spiral wing 27*b* provided in the rotation shaft 27*a*. The toner in the first and second toner containers 21 and 22 may be transported to the toner discharging unit 23 by the toner transport members 25 and 26, and the toner in the toner discharging unit 23 may be transported to the toner outlet 24 by the toner transport member 27**.

The toner container 20 may include a first side portion 20-1 and a second side portion 20-2. The toner cartridge 230 may be attached to and detached from a main body (e.g., 300 of FIG. 12) of the image forming apparatus. The toner cartridge 230 may slide in the first direction Z to be attached to and detached from the main body 300. The first side portion 20-1 may be a side portion in a removal direction of the toner cartridge 230, i.e., a +Z direction, and the second side portion 20-2 may be a side portion in an opposite side of the first side portion 20-1, i.e., a −Z direction. A follower 29 for driving the toner transport members 25, 26, and 27 may be provided in the second side portion 20-2. A driving unit 301 may be provided in the main body 300 of the image forming apparatus. The follower 29 connected to a driving unit 301 may be provided in the second side portion 20-2 of the toner container 20. Based on the toner cartridge 230 being mounted on the main body 300 of the image forming apparatus, the follower 29 may be connected to the driving unit 301. The toner transport members 25, 26, and 27 may be connected to the follower 29. The follower 29 may include, for example, gears 29-1, 29-2, and 29-3. The rotation shafts **25*a*, 26*a*, and 27*a* of the toner transport members 25, 26, and 27 may include end portions 25*d*, 26*d*, and 27*d* protruding from the second side portion 20-2. The gears 29-1, 29-2, and 29-3 may be respectively connected to the end portions 25*d*, 26*d*, and 27*d* of the toner transport members 25, 26, and 27. Based on the toner cartridge 230 being mounted on the main body 300 of the image forming apparatus, the driving unit 301 may be connected to the follower 29 such that the toner transport members 25, 26, and 27 may be driven. A structure that is to receive a driving power from the driving unit 301 of the main body 300 of the image forming apparatus, e.g., the second side portion 20-2 where the follower 29 is installed may be referred to as a driving side portion, and the first side portion 20-1 where the structure that is to receive the driving power from the driving unit 301 of the main body 300** of the image forming apparatus is not installed may be referred to as a non-driving side portion.

Figure 2:
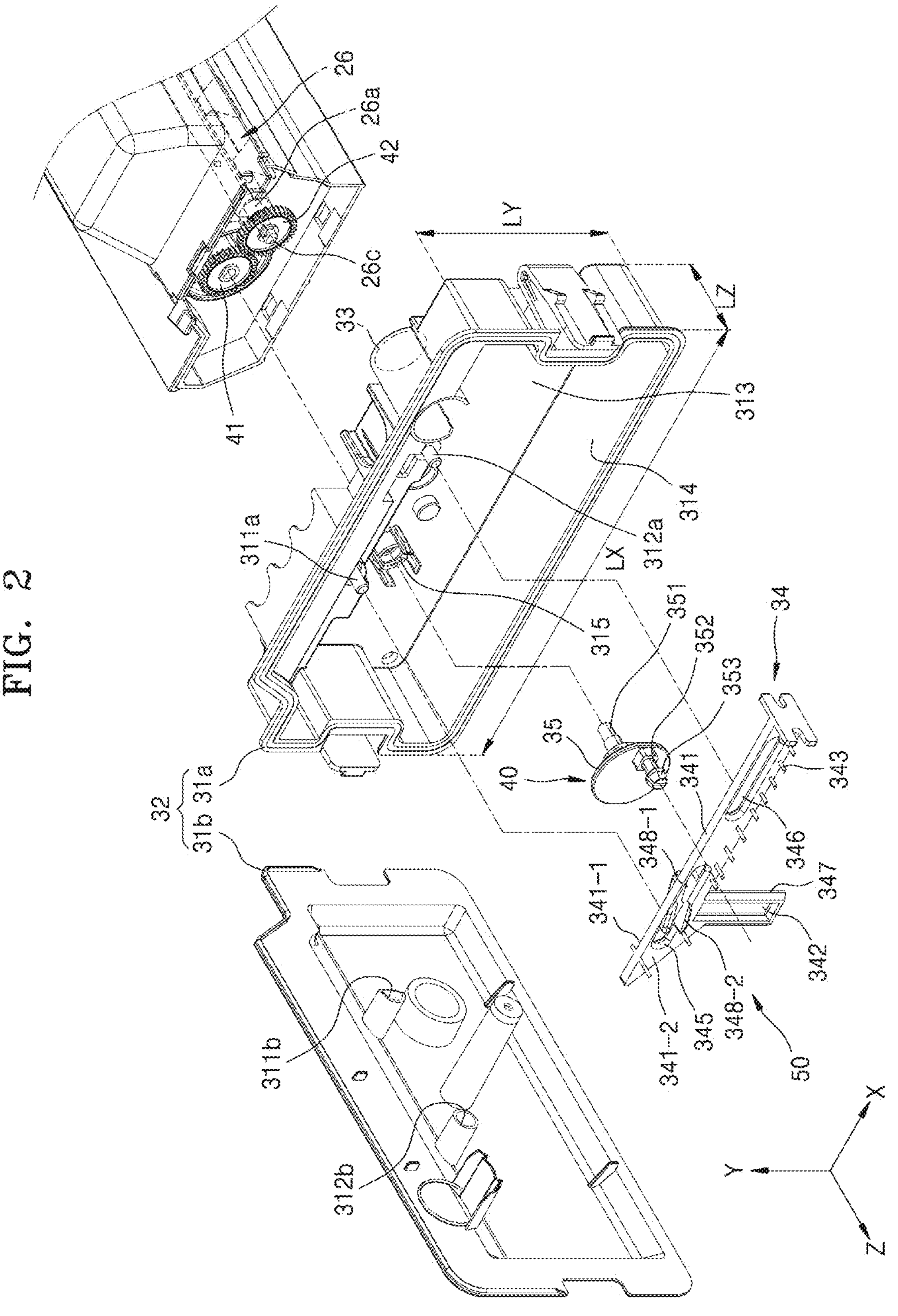
FIG. 2 is an exploded perspective view of a waste toner container according to an example.

FIG. 2 is an exploded perspective view of the waste toner container 32 according to an example. Referring to FIGS. 1 and 2, the waste toner container 32 may contain waste toner discharged from a developing device (e.g., 10 of FIG. 12 described below). The waste toner container 32 may be disposed in a side portion of the toner container 20 in the first direction Z. The waste toner container 32 may be disposed in a non-driving side portion of the toner container 20, i.e., the first side portion 20-1. The waste toner container 32 may have lengths LZ, LX, and LY in the first direction Z, the second direction X, and the third direction Y that are orthogonal to one another. The second direction (e.g., the horizontal direction) X may be a transverse direction. The third direction (e.g., the vertical direction) Y may be a gravity direction. The first direction (e.g., the depth direction) Z may be an axial direction of a photoconductive drum (e.g., 1 of FIG. 12) or a developing roller (e.g., 101 of FIG. 12) described later. The first direction Z may be a direction in which the toner cartridge 230 is attached to/detached from the main body (e.g., 300 of FIG. 12) of the image forming apparatus. In the waste toner container 32, a waste toner inlet 33 into which waste toner is to flow may be provided. For example, the waste toner inlet 33 may have a shape opened in the first direction Z.

The waste toner container 32 may be implemented by, for example, a first housing **31*a* and a second housing 31*b* that are coupled to each other in the first direction Z. In an example, the waste toner container 32 is illustrated as having a rectangular parallelepiped shape. However, the waste toner container 32 is not necessarily in the rectangular parallelepiped shape. Also, the position of the waste toner inlet 33 is not limited. The waste toner inlet 33 may be located as far as possible from a bottom 314 of the waste toner container 32 in the second direction Y. In a non-limiting example, the waste toner inlet 33 may be formed open in the first direction Z around a sidewall 313 of the waste toner container 32 in the first direction Z, e.g., an upper portion of the sidewall 313**.

The dispersing member 34 may be located inside the waste toner container 32 to disperse the waste toner inside the waste toner container 32. The driving transfer member 40 may receive rotation power from one of the toner transport members 25, 26, and 27, e.g., the toner transport member 26, to drive the dispersing member 34. The dispersing member 34 and the driving transfer member 40 may have various structures to disperse the waste toner inside the waste toner container 32.

Figure 3:
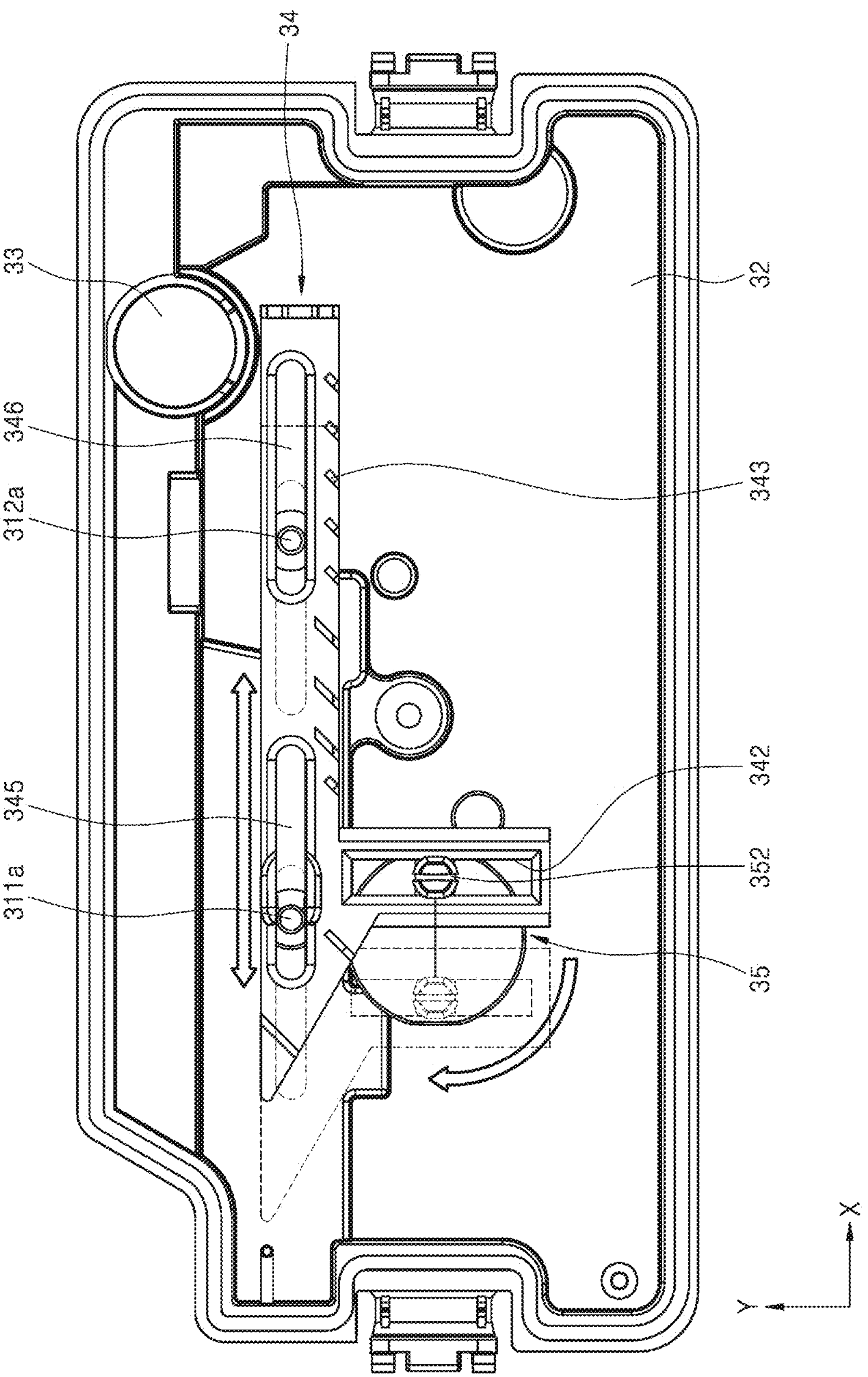
FIG. 3 is a front view showing a driving transfer member and a dispersing member according to an example.

For example, the driving transfer member 40 may reciprocate the dispersing member 34 in the second direction X. As the dispersing member 34 reciprocates in the second direction X, the dispersing member 34 may transport and disperse the waste toner inside the waste toner container 32 in the second direction X. FIG. 3 is a front view showing the driving transfer member 40 and the dispersing member 34 according to an example. Referring to FIGS. 2 and 3, the dispersing member 34 may extend in the second direction X. The dispersing member 34 may include a body 341 extending in the second direction X and a plurality of dispersing ribs 343 protruding from the body 341 to stir the waste toner. The dispersing ribs 343 may protrude from the body 341 in the first direction Z. The dispersing ribs 343 may be inclined with respect to the second direction X. For example, slots 345 and 346 cut in the second direction X may be provided in the body 341 of the dispersing member 34. The slots 345 and 346 may be formed apart from each other in the second direction X. A length of the slots 345 and 346 may be greater than or equal to a stroke in the second direction X of the dispersing member 34. Protrusions 311*a* and 312*a* respectively inserted into the slots 345 and 346 may be provided in the first housing 31*a*. Stoppers 311*b* and 312*b* may be provided in the second housing 31*b*. Based on the first housing 31*a* and the second housing 31*b* being coupled to each other, the stoppers 311*b* and 312*b* may be opposed to the protrusions 311*a* and 312*a* passing through the slots 345 and 346 to prevent the dispersing member 34 from leaving the protrusions 311*a* and 312*a*. In a non-limiting example, the stoppers 311*b* and 312*b* may have the form of holes into which the protrusions 311*a* and 312*a* passing through the slots 345 and 346 may be partially inserted. As described below, lengths of the protrusions 311*a* and 312*a* in the first direction Z may be greater than a length (e.g., a thickness) of the body 341 of the dispersing member 34 in the first direction Z such that the dispersing member 34 may move in the first direction Z. The dispersing member 34 may be supported by the protrusions 311*a* and 312*a* to move in the second direction X.

The dispersing member 34 may include a sliding groove 342 extending in the third direction Y that is orthogonal to the first direction Z and the second direction X. An example of the driving transfer member 40 that reciprocates the dispersing member 34 in the second direction X may include a rotating member 35 and gears 41 and 42. The rotating member 35 may include a rotation shaft 351 in the first direction Z and an eccentric pin 352 positioned to be deviated from the rotation shaft 351 and inserted into the sliding groove 342. For example, the sliding groove 342 may be formed as a cut in the first direction Z in an extension portion 347 extending in the third direction Y from the body 341. The rotation shaft 351 may be supported rotatably, for example, in a support hole 315 provided in the first housing 31*a*. The eccentric pin 352 may be inserted into the sliding groove 342. The length of the sliding groove 342 in the third direction Y may be twice greater than or equal to the amount of deviation of the eccentric pin 352 with respect to the rotation shaft 351. In an end portion of the eccentric pin 352, a departure preventing portion 353 for preventing the eccentric pin 352 from leaving the sliding groove 342 may be provided. For example, the departure preventing portion 353 may have an elastic piece structure that shrinks elastically based on the eccentric pin 352 being inserted into the sliding groove 342 and elastically returns to the original state after the eccentric pin 352 is inserted into the sliding groove 342.

The rotation shaft 351 of the rotating member 35 may protrude toward the first side portion 20-1 of the toner container 20 through the support hole 315. The gear 41 may be coupled to the rotation shaft 351. An end portion 26*c* of the rotation shaft 26*a* of the toner transport member 26 may protrude from the first side portion 20-1 of the toner container 20. The gear 42 may be coupled to the end portion 26*c* of the rotation shaft 26*a* of the toner transport member 26. The gear 41 may engage with the gear 42. Based on the toner transport member 26 being rotated, the rotation power of the toner transport member 26 may be transported to the rotating member 35 through the gear 41 and the rotating member 25 may be rotated. Based on the rotating member 35 being rotated, rotational movement of the rotating member 35 may be transformed into linear reciprocation of the dispersing member 34 in the second direction X as indicated by a dotted line and a solid line in FIG. 3. A stroke of the dispersing member 34 in the second direction X may be twice the amount of deviation of the eccentric pin 352 with respect to the rotation shaft 351. As the dispersing member 34 reciprocates in the second direction X, the dispersing ribs 343 may transport the waste toner in the second direction X to disperse the waste toner inside the waste toner container 32. Although not shown in the drawings, at least one connection gear may be interposed between the gear 41 and the gear 42.

An example of the toner cartridge 230 may include a vibration driving unit 50 to reciprocate (vibrates) the dispersing member 34 in the first direction Z in conjunction with reciprocation of the dispersing member 34 in the second direction X. An example of the vibration driving unit 50 to reciprocate the dispersing member 34 in the first direction Z may include a slope portion and a contact portion that mutually contact each other. The slope portion may have a form extending in the second direction X and inclined in the first direction Z. The slope portion may be provided in either of the dispersing member 34 and the waste toner container 32, and the contact portion may be provided in the other of the dispersing member 34 and the waste toner container 32. Based on the dispersing member 34 moving in the second direction X, the dispersing member 34 may vibrate in the first direction Z due to interaction between the slope portion and the contact portion.

FIGS. 4 to 7 are cross-sectional views showing the vibration driving unit 50 to reciprocate the dispersing member 34 in the first direction Z according to an example. Referring to FIGS. 4 to 7, an example of the vibration driving unit 50 may include a first slope portion 348-1, a second slope portion 348-2, a first contact portion 316*a*, and a second contact portion 316*b*. The first slope portion 348-1 and the second slope portion 348-2 may be provided in either of the dispersing member 34 and the waste toner container 32, and the first contact portion 316*a* and the second contact portion 316*b* may be provided in the other of the dispersing member 34 and the waste toner container 32. In the example illustrated in FIGS. 4 to 7, the first slope portion 348-1 and the second slope portion 348-2 may be provided in the dispersing member 34, and the first contact portion 316*a* and the second contact portion 316*b* may be provided in the waste toner container 32. The first slope portion 348-1 and the second slope portion 348-2 may extend in the second direction X and may have a slope in the first direction Z. The first slope portion 348-1 and the second slope portion 348-2 may be symmetric to each other in the second direction X and the first direction Z.

The dispersing member 34 may include a first surface 341-1 and a second surface 341-2. For example, the first surface 341-1 may be a surface in a −Z direction, and the second surface 341-2 may be a surface in a +Z direction. The first slope portion 348-1 may be provided on the first surface 341-1. The amount of protrusion in the −Z direction of the first slope portion 348-1 may increase from the first surface 341-1 toward a +X direction. The second slope portion 348-2 may be provided on the second surface 341-2. The amount of protrusion in the +Z direction of the second slope portion 348-2 may increase from the second surface 341-2 toward a −X direction. The first slope portion 348-1 and the second slope portion 348-2 may be positioned apart from each other in the second direction X. Thus, the first slope portion 348-1 and the second slope portion 348-2 that are symmetric to each other in the second direction X and the first direction Z may be implemented. The first contact portion 316*a* and the second contact portion 316*b* may be provided in the first housing 31*a* and the second housing 31*b* to respectively contact the first slope portion 348-1 and the second slope portion 348-2. The forms of the first contact portion 316*a* and the second contact portion 316*b* are not limited as long as the first contact portion 316*a* and the second contact portion 316*b* are able to guide the dispersing member 34 in the first direction Z in contact with the first slope portion 348-1 and the second slope portion 348-2. In an example, the first contact portion 316*a* and the second contact portion 316*b* have forms inclined in parallel to the first slope portion 348-1 and the second slope portion 348-2, respectively.

Figure 4:
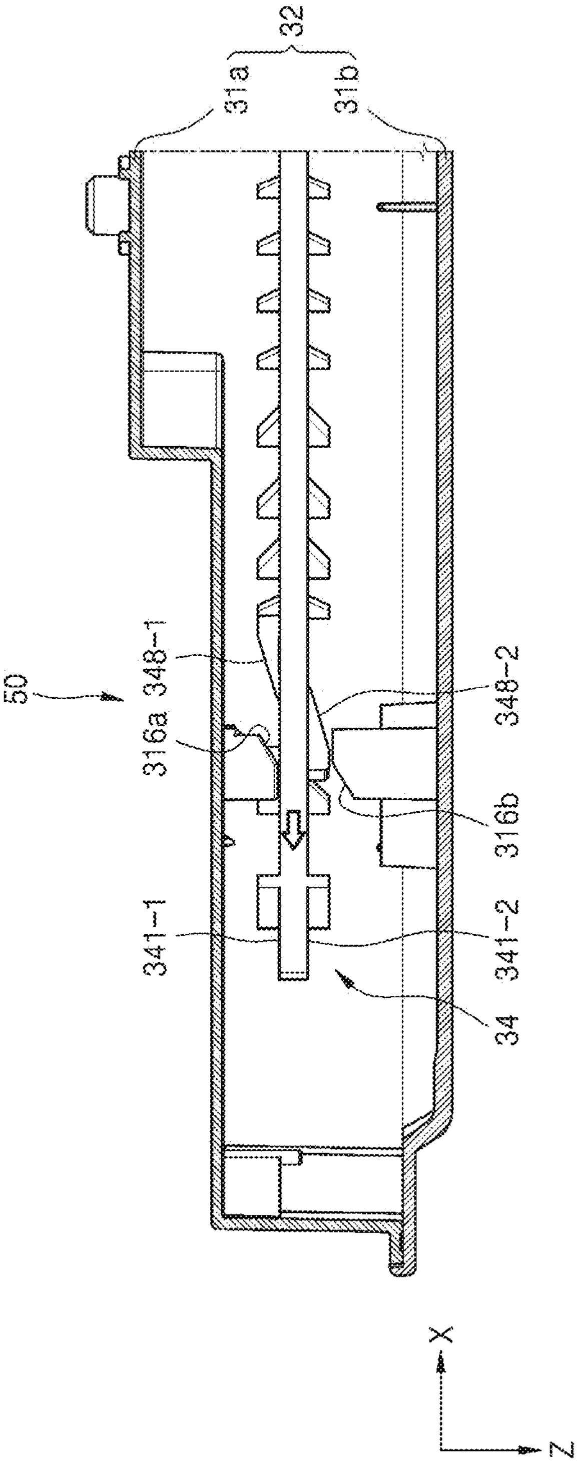
FIGS. 4 to 7 are cross-sectional views showing a vibration driving unit to move a dispersing member in a depth direction according to an example.
Figure 5:
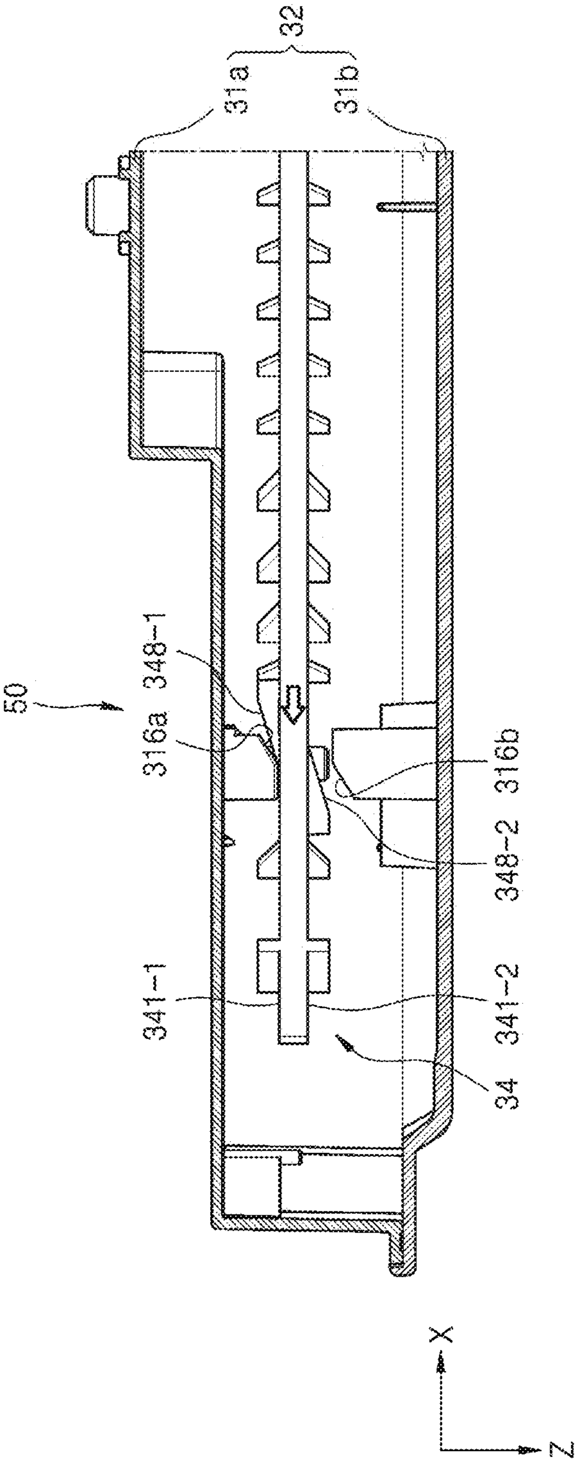
Figure 6:
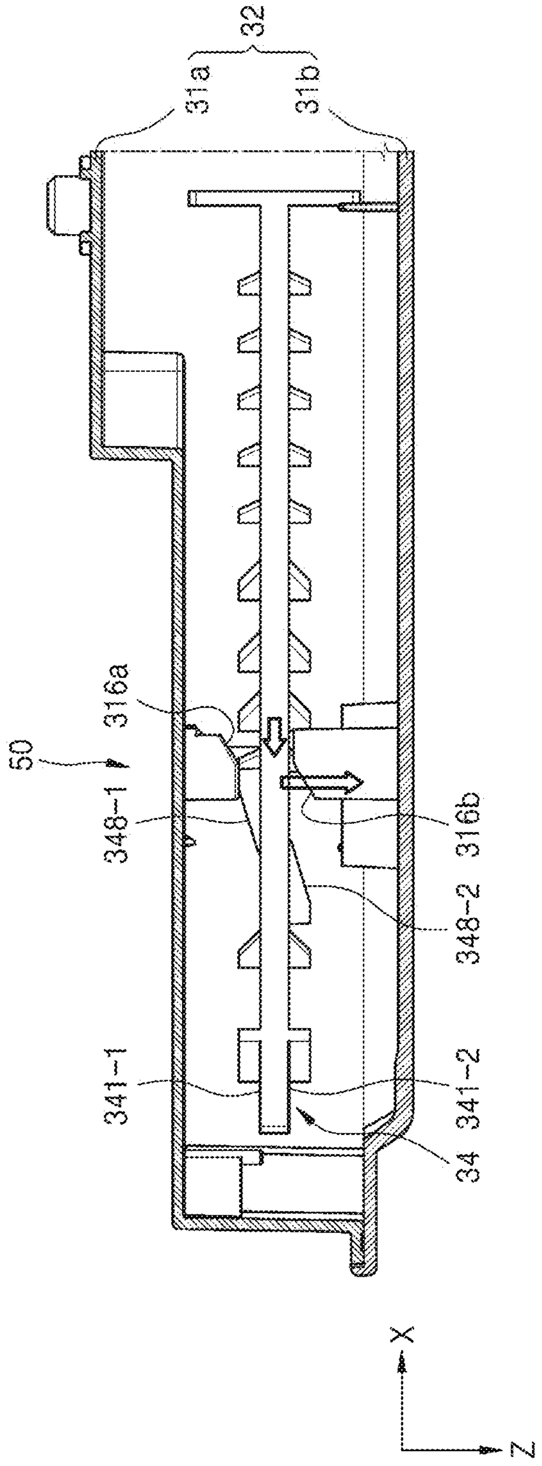
Figure 7:
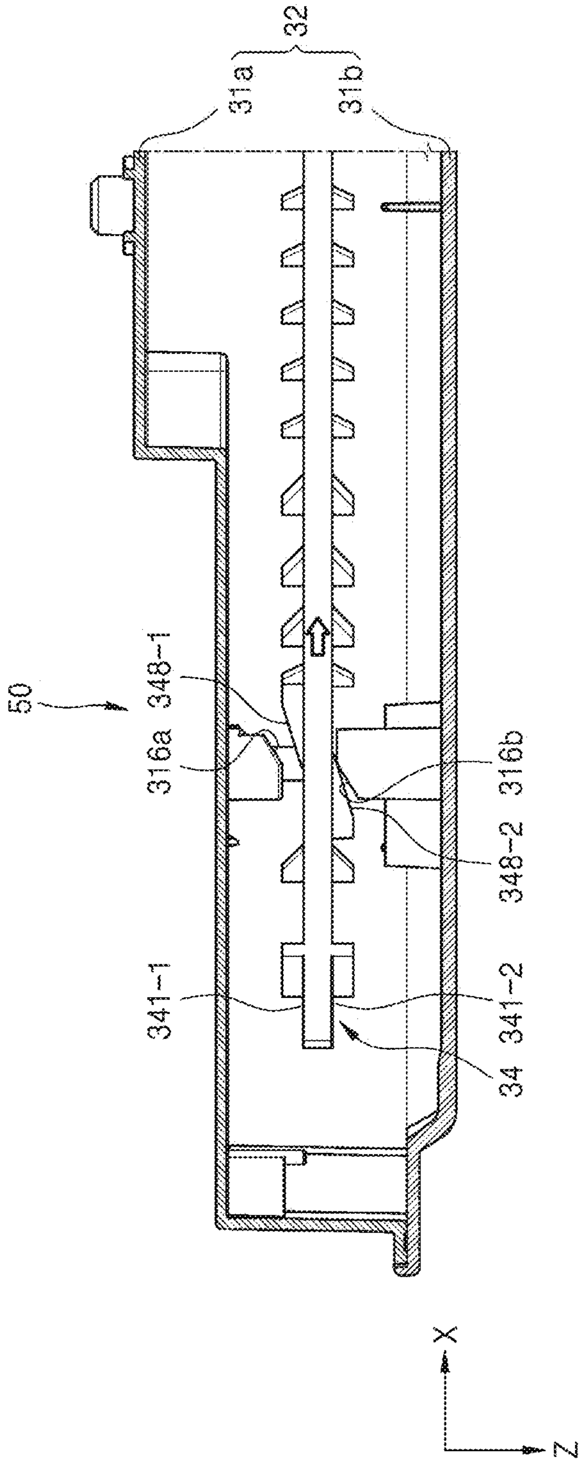

For example, referring to FIG. 4, the second slope portion 348-2 and the second contact portion 316*b* may contact each other. The rotating member 35 may be rotated in this state such that the dispersing member 34 may be moved in the −X direction. The second slope portion 348-2 may be separated from the second contact portion 316*b*. The first slope portion 348-1 may approach the first contact portion 316*a*. As shown in FIG. 5, based on the dispersing member 34 continuing to move in the −X direction after the first slope portion 348-1 contacts the first contact portion 316*a*, the amount of interference between the first slope portion 348-1 and the first contact portion 316*a* may gradually increase and the dispersing member 34 may move in the +Z direction. Based on the dispersing member 34 reaching an end position in the −X direction as shown in FIG. 6, displacement of the dispersing member 34 in the +Z direction may be maximum. Based on the rotating member 35 continuing to rotate in the state shown in FIG. 6, the dispersing member 34 may start moving in the +X direction. As shown in FIG. 7, the first slope portion 348-1 may be separated from the first contact portion 316*a* and the second slope portion 348-2 may contact the second contact portion 316*b*. The amount of interference between the second slope portion 348-2 and the second contact portion 316*b* may gradually increase, and the dispersing member 34 may move in the −Z direction. Based on the dispersing member 34 reaching an end position in the +X direction as shown in FIG. 4, displacement of the dispersing member 34 in the −Z direction may be maximum.

As such, based on the dispersing member 34 reciprocating in the second direction X upon rotation of the rotating member 35, the dispersing member 34 may reciprocate in the first direction Z due to interaction between the first and second slope portions 348-1 and 348-2 and the first and second contact portions 316*a* and 316*b* in this process. The waste toner flowing in the waste toner container 32 through the waste toner inlet 33 may be dispersed in the second direction X by the dispersing member 34 reciprocating in the second direction X under the waste toner inlet 33, e.g., the dispersing rib 343. The waste toner may be mainly accumulated under the waste toner inlet 33. Based on the height of the accumulated waste toner reaching the height of the dispersing rib 343 of the dispersing member 34, the waste toner may be transported to a position away from the waste toner inlet 33 in the second direction X by the dispersing member 34 reciprocating in the second direction X.

To disperse the waste toner in the first direction Z, the length of the dispersing rib 343 in the first direction Z may be increased. In this case, interference between other shapes inside the waste toner container 32 and the dispersing rib 343 may be considered. For example, interference between a structure for reciprocating the dispersing member 34 in the second direction X and the dispersing rib 343, interference between a structure for coupling the first and second housings 31*a* and 31*b* forming the waste toner container 32 and the dispersing rib 343, etc., may be considered. In various examples, the length of the dispersing rib 343 in the first direction Z may be limited. In the current example, as the dispersing member 34 moves in the first direction Z in conjunction with movement in the second direction X, the dispersing member 34 may effectively disperse the waste toner in the first direction Z.

The toner cartridge 230 may be mounted on the main body 300 of the image forming apparatus to supply toner to the developing device 10 and to contain waste toner discharged from the developing device 10 in an image forming process. Even in a situation in which the toner remains in the toner container 20, the toner cartridge 230 may be removed from the main body 300 of the image forming apparatus and a new toner cartridge 230 may be mounted on the image forming apparatus in a situation in which the waste toner container 32 is filled with the waste toner. According to the toner cartridge 230 of the current example, the waste toner may be uniformly dispersed inside the waste toner container 32, thereby efficiently containing the waste toner in a limited capacity. Thus, the replacement period of the toner cartridge 230 that is a consumable supply may be lengthened. Moreover, the size of the waste toner container 32 may be reduced to contain the same amount of waste toner, such that a size of the image forming apparatus employing the waste toner container 32 may be made smaller. The rotation power of the toner transport member 26 may be transported to the dispersing member 34 by the driving transfer member 40. In that case, a power transmission member such as a separate driving motor, a separate gear, etc., for driving the dispersing member 34 in the main body 300 of the image forming apparatus is unnecessary, thus being helpful in lowering the price of the image forming apparatus. The waste toner container 32 and the driving transfer member 40 are provided in the first side portion 20-1 of the toner container 20, i.e., a non-driving side portion, such that a structure of the second side portion 20-2 of the toner container 20 provided with the follower 29 receiving a driving power from the main body 300 may be simplified.

Although not shown in the drawings, the vibration driving unit 50 may have a structure in which the plurality of first and second slope portions 348-1 and 348-2 and the plurality of first and second contact portions 316*a* and 316*b* corresponding thereto are arranged in the second direction X. Although not shown in the drawings, the vibration driving unit 50 may have a structure in which the plurality of first and second slope portions 348-1 and 348-2 and the plurality of first and second contact portions 316*a* and 316*b* corresponding thereto are arranged in the second direction X and in the third direction Y.

Figure 8:
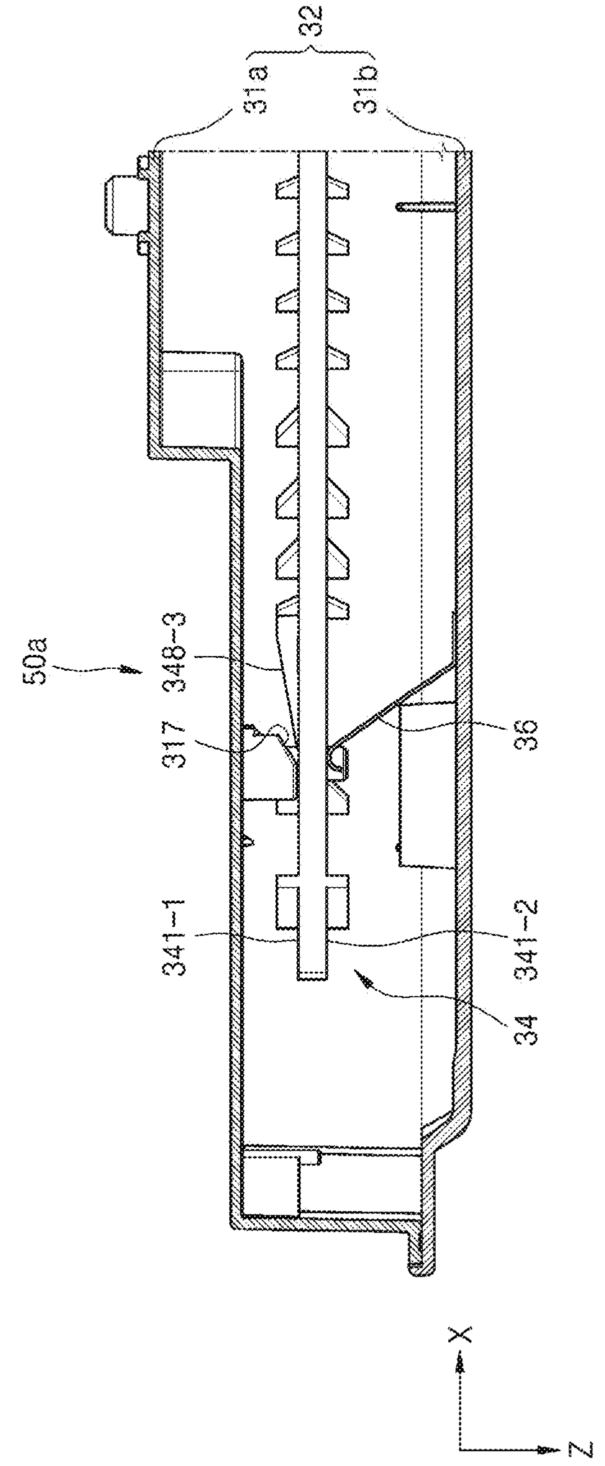
FIGS. 8 and 9 are cross-sectional views showing a vibration driving unit to reciprocate a dispersing member in a first direction according to an example.
Figure 9:
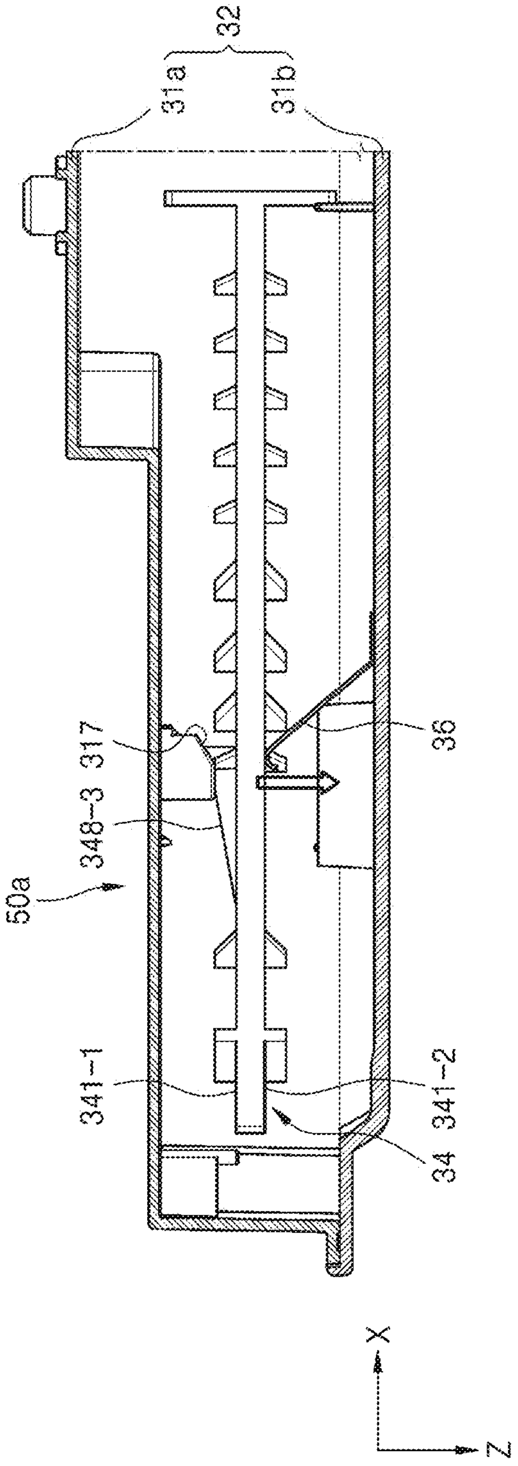

FIGS. 8 and 9 are cross-sectional views showing a vibration driving unit 50*a* to reciprocate the dispersing member 34 in the first direction Z according to an example. The vibration driving unit 50*a* is different from the vibration driving unit 50 shown in FIGS. 4 to 7 in that a slope portion 348-3, a contact portion 317, and a second elastic member 36 are employed. A difference will be mainly described below. Referring to FIGS. 8 and 9, an example of a structure to reciprocate the dispersing member 34 in the first direction Z may include the slope portion 348-3, the contact portion 317, and the second elastic member 36. The slope portion 348-3 may be provided in either of the dispersing member 34 and the waste toner container 32, and the contact portion 317 may be provided in the other of the dispersing member 34 and the waste toner container 32. In the example illustrated in FIGS. 8 and 9, the slope portion 348-3 may be provided in the dispersing member 34, and the contact portion 317 may be provided in the waste toner container 32. The slope portion 348-3 may extend in the second direction X and may have a slope in the first direction Z. For example, the dispersing member 34 may include the first surface 341-1 and the second surface 341-2. The first surface 341-1 may be a surface in the −Z direction, and the second surface 341-2 may be a surface in the +Z direction. The slope portion 348-3 may be provided on the first surface 341-1. The amount of protrusion in the −Z direction of the slope portion 348-3 may increase from the first surface 341-1 toward the +X direction. The contact portion 317 may extend from the first housing 31*a* opposed to the first surface 341-1 of the dispersing member 34 into the waste toner container 32 and may contact the slope portion 348-3. The second elastic member 36 may apply an elastic force to the dispersing member 34 such that the slope portion 348-3 and the contact portion 317 contact each other. In the current example, the second elastic member 36 may apply the elastic force, for example, in the −Z direction, to the second surface 341-2 of the dispersing member 34. Thus, the slope portion 348-3 and the contact portion 317 may be maintained in contact with each other. The second elastic member 36 may be implemented by, for example, a leaf spring. For example, an end portion of the leaf spring may be supported by the second housing 31*b*, and the other end portion may contact the second surface 341-2 of the dispersing member 34 to push the dispersing member 34 in the −Z direction. The other end portion of the leaf spring may be in sliding contact with the dispersing member 34.

Referring to FIG. 8, the contact portion 317 may contact an end portion with the smallest amount of protrusion of the slope portion 348-3, i.e., an end portion in the −X direction. Based on the rotating member 35 being rotated in this state, the dispersing member 34 may be moved in the −X direction. As the dispersing member 34 is moved in the −X direction, the amount of interference between the contact portion 317 and the slope portion 348-3 may gradually increase and the dispersing member 34 may be moved in the +Z direction. Based on the dispersing member 34 reaching an end position in the −X direction as shown in FIG. 9, displacement of the dispersing member 34 in the +Z direction may be maximum. The second elastic member 36 may be elastically transformed, and elastic energy may be accumulated. Based on the rotating member 35 continuing to rotate in the state shown in FIG. 9, the dispersing member 34 may be moved in the +X direction. Thus, the amount of interference between the contact portion 317 and the slope portion 348-3 may be gradually reduced. The dispersing member 34 may be moved in the −Z direction by the elastic force of the second elastic member 36. Based on the dispersing member 34 returning to the end position in the −X direction as shown in FIG. 8, displacement of the dispersing member 34 in the −Z direction may be maximum.

As such, the dispersing member 34 may be reciprocated in the first direction Z in conjunction with reciprocation of the dispersing member 34 in the second direction X. Although not shown in the drawings, the plurality of slope portions 348-3 and the plurality of contact portions 317 corresponding thereto may be arranged in the second direction X. Although not shown in the drawings, the plurality of slope portions 348-3 and the plurality of contact portions 317 corresponding thereto may be arranged in the second direction X and the third direction Y.

Figure 10:
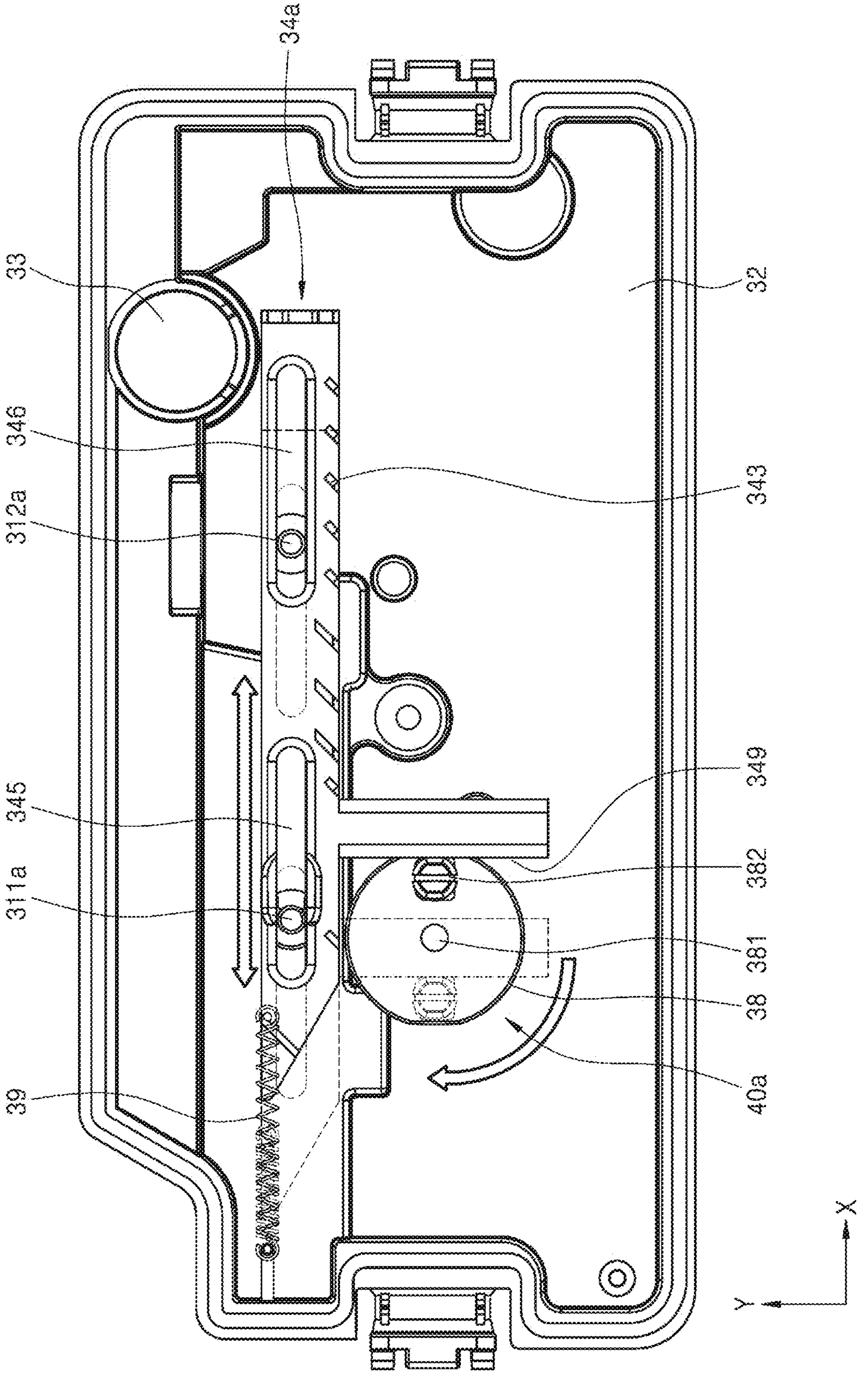
FIG. 10 is a front view showing a driving transfer member to reciprocate a dispersing member in a second direction according to an example.

FIG. 10 is a front view showing a driving transfer member 40*a* to reciprocate a dispersing member 34*a* in the second direction X according to an example. The driving transfer member 40*a* of the example illustrated in FIG. 10 is different from the structures shown in FIGS. 2 and 3 in that a rotation cam 38 and a first elastic member 39 are employed. A difference will be mainly described below. Referring to FIG. 10, the dispersing member 34*a* may include a cam contact portion 349 extending in the third direction Y. The driving transfer member 40*a* may include the rotation cam 38 including an eccentric protrusion 382, gears 41 and 42 of FIG. 2 connecting the rotation cam 38 with the toner transport member 26 of FIG. 2, and the first elastic member 39 to apply an elastic force to the dispersing member 34*a* such that the cam contact portion 349 contacts the eccentric protrusion 382.

The rotation cam 38 may include a rotation shaft 381. The rotation shaft 381 may be supported rotatably, for example, in the support hole 315 of FIG. 1 provided in the first housing 31*a* of FIG. 1. The rotation shaft 381 may partially protrude through the support hole 315, and the gear 41 may be coupled to the rotation shaft 381. The gear 41 may engage with the gear 42 coupled to the rotation shaft 26*a* of the toner transport member 26. The eccentric protrusion 382 may be deviated with respect to the rotation shaft 381. The cam contact portion 349 may extend in the third direction Y from the body 341 of the dispersing member 34*a*. The cam contact portion 349 may contact the eccentric protrusion 382. The first elastic member 39 may be implemented by a tension coil spring having, for example, an end portion connected to the first housing 31*a* and the other end portion connected to the dispersing member 34*a*.

Based on the rotation cam 38 being rotated in a state indicated by a dotted line in FIG. 10, the dispersing member 34*a* may be moved in the −X direction by an elastic force of the first elastic member 39 as the eccentric protrusion 382 moves away from the cam contact portion 349. Based on the rotation cam 38 being rotated, for example, by 180 degrees, the dispersing member 34*a* may reach an end in the −X direction as indicated by a dotted line in FIG. 10. Based on the rotation cam 38 being continuously rotated, the eccentric protrusion 382 may push the cam contact portion 349 in the +X direction to move the dispersing member 34*a* in an opposite direction to the elastic force of the first elastic member 39, i.e., in the +X direction. Based on the rotation cam 38 being rotated by 360 degrees, the dispersing member 34*a* may reach the end in the +X direction as indicated by a solid line in FIG. 10. A stroke of the dispersing member 34 in the second direction X may be twice the amount of deviation of the eccentric protrusion 382 with respect to the rotation shaft 381.

A structure for reciprocating the dispersing member 34*a* in the first direction Z may be in conjunction with movement of the dispersing member 34*a* in the second direction X. As the structure for reciprocating the dispersing member 34*a* in the first direction Z, the vibration driving unit 50 or the vibration driving unit 50*a* shown in FIGS. 4 to 9 may be applied.

Figure 11:
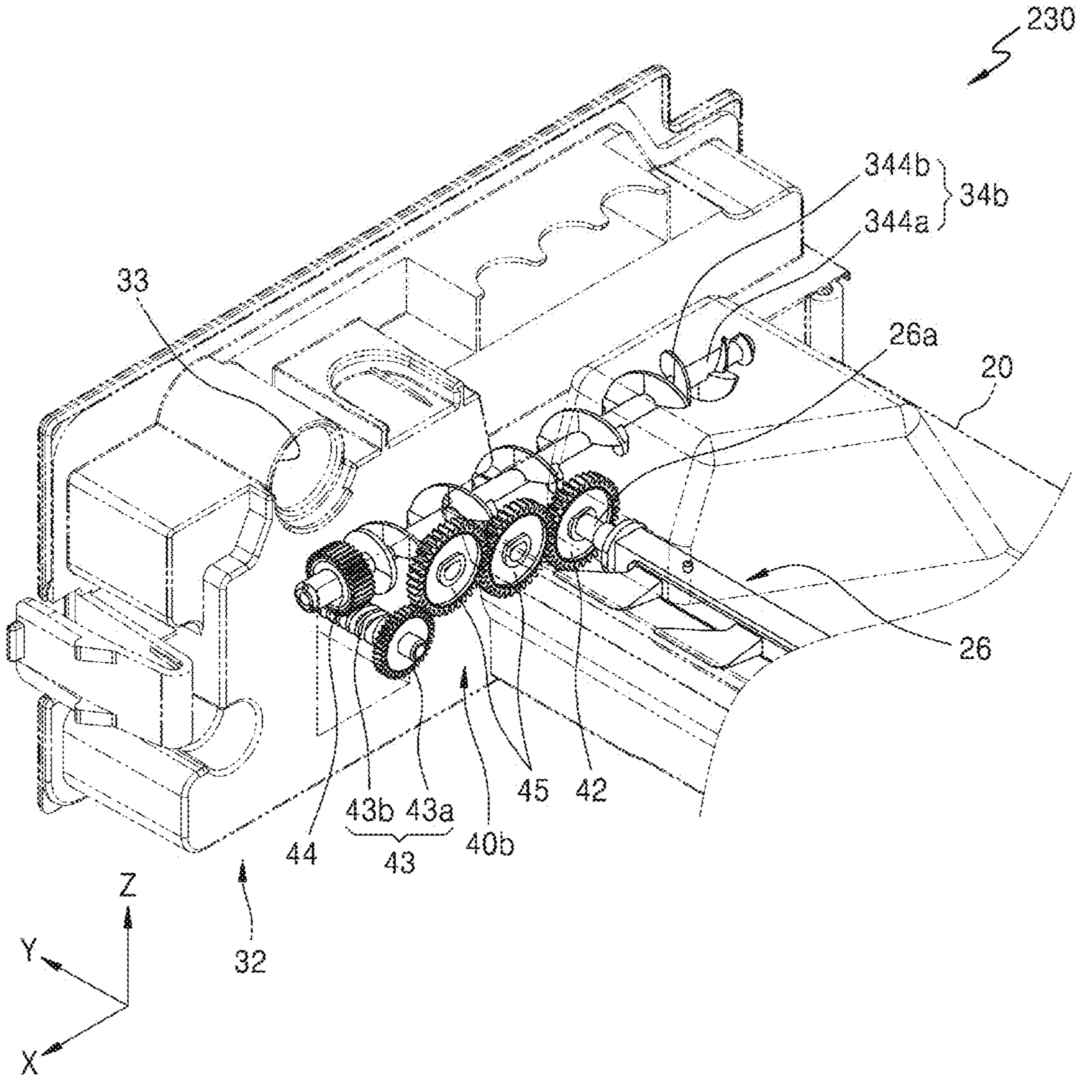
FIG. 11 is a partial perspective view showing a toner cartridge according to an example.

FIG. 11 is a partial perspective view showing the toner cartridge 230 according to an example. Referring to FIG. 11, the toner container 20 and the waste toner container 32 are shown. The dispersing member 34*b* may be dispersed inside the waste toner container 32. The dispersing member 34*b* may include a rotation shaft 344*a* extending in the second direction X and a spiral wing 344*b* formed on the rotation shaft 344*a*. The dispersing member 34*b* may have an auger shape to transport the waste toner in the second direction X. A driving transfer member 40*b* may transmit the rotation power of the toner transport member 26 to the dispersing member 34*b* to rotate the dispersing member 34*b*. The driving transfer member 40*b* may convert the rotation power of the toner transport member 26 with respect to an axis in the first direction Z into the rotation power with respect to an axis in the second direction X and transmit the rotation power to the dispersing member 34*b*. For example, the driving transfer member 40*b* may include a first conversion gear 43 connected to the toner transport member 26 to rotate and a second conversion gear 44 connected to the rotation shaft 344*a* of the dispersing member 34*b* to change a rotation direction by engaging with the first conversion gear 43. The first conversion gear 43 and the second conversion gear 44 may be gears in various forms capable of changing the rotation direction. For example, the first conversion gear 43 may include a worm gear portion 43*b* in the first direction Z, and the second conversion gear 44 may be a pinion gear engaging with the worm gear portion 43*b* in the first direction Z. The gear 42 may be coupled to the rotation shaft 26*a* of the toner transport member 26, e.g., the end portion 26*c* of FIG. 2. The first conversion gear 43 may include the worm gear portion 43*b* and a spur gear portion 43*a*. The spur gear portion 43*a* may be connected to the gear 42 by gears 45. The second conversion gear 44 may engage with the worm gear portion 43*b*. Although not shown in the drawings, a bevel gear portion may be applied in place of the worm gear portion 43*b*, and the second conversion gear 44 may be a bevel gear orthogonally engaging with the bevel gear portion of the first conversion gear 43. With such a structure, the rotation power of the toner transport member 26 may be transported to the dispersing member 34*b*. Based on the dispersing member 34*b* being rotated, the waste toner inside the waste toner container 32 may be transported in the second direction X by the spring wing 344*b* and thus dispersed inside the waste toner container 32.

Figure 12:
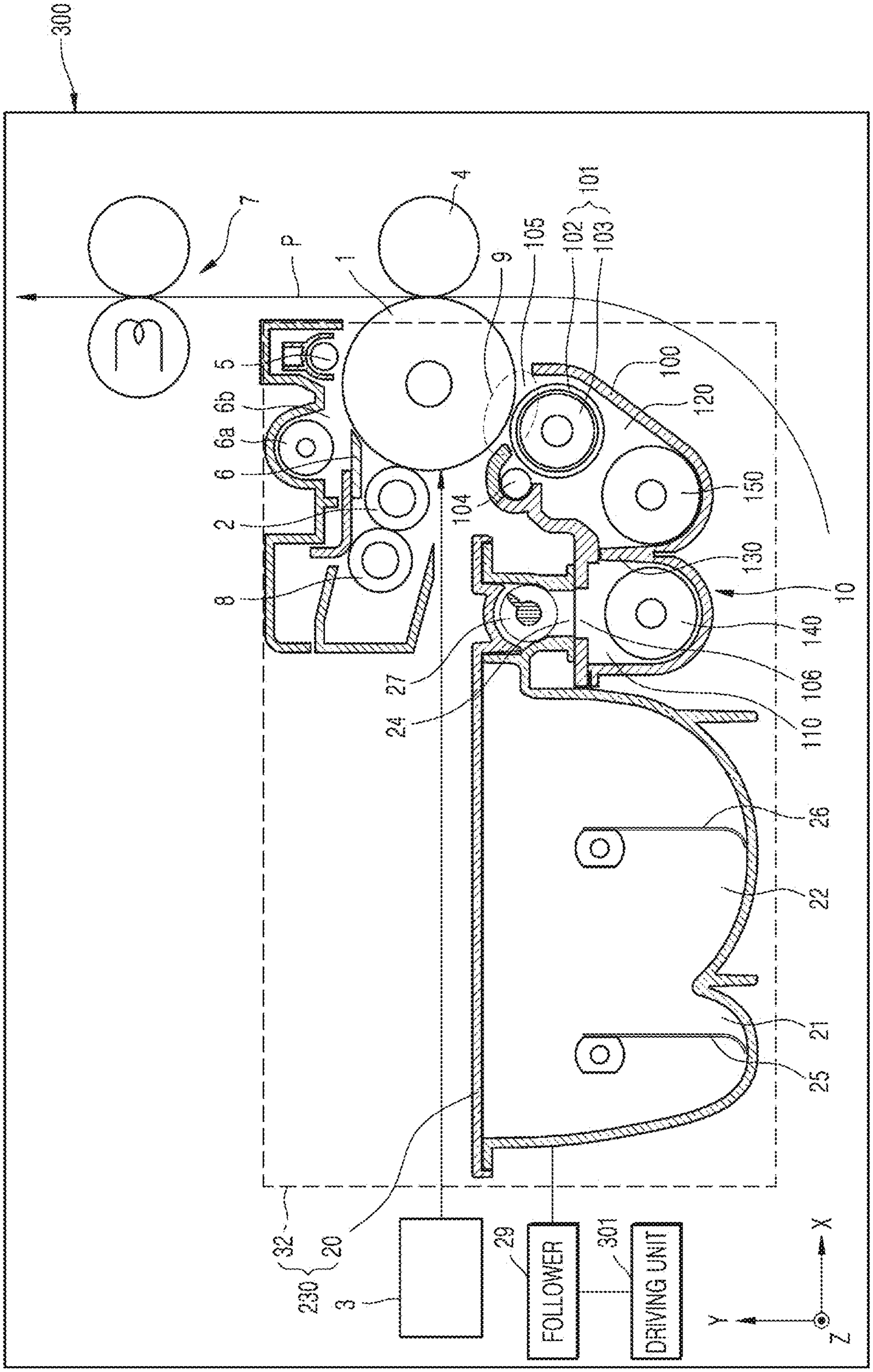
FIG. 12 is a schematic diagram showing an electrophotographic image forming apparatus according to an example.

FIG. 12 is a schematic diagram showing an electrophotographic image forming apparatus according to an example. The image forming apparatus of the current example may be a monochromatic image forming apparatus that employs a two-component developer including toner and a magnetic carrier. The toner may have, for example, a black color. Referring to FIG. 12, the image forming apparatus may include the main body 300 and the developing device 10 attachable to and detachable from the main body 300. In the main body 300, an optical scanner 3, a transfer unit, and a fuser 7 may be provided.

A photoconductive drum 1 is an example of a photoconductor on which an electrostatic latent image is formed. The photoconductive drum 1 may include a cylindrical metallic pipe and a photoconductive layer having photoconductivity formed on an outer circumference of the metallic pipe. A charging roller 2 is an example of a charger to charge the surface of the photoconductive drum 1 with a uniform surface electric potential. The charging roller 2 may be rotated in contact with the photoconductive drum 1, and a charging bias voltage may be applied to the charging roller 2. As the charger, a corona charger may be used which charges the surface of the photoconductive drum 1 by causing corona discharging through application of a bias voltage between a flat electrode and a wire electrode. A cleaning roller 8 may remove a foreign substance from the surface of the charging roller 2. A cleaning blade 6 may remove toner remaining on the surface of the photoconductive drum 1 after a transfer process. A static charge eliminator 5 that eliminates the remaining potential on the photoconductive drum 1 may be disposed in an upstream side of the cleaning blade 6 with respect to the rotation direction. The static charge eliminator 5 may irradiate light to, for example, the surface of the photoconductive drum 1.

The optical scanner 3 may form an electrostatic latent image by irradiating light corresponding to image information to the surface of the charged photoconductive drum 1. As the optical scanner 3, for example, a laser scanning unit (LSU) that deflects light irradiated from a laser diode in a main scanning direction by using a polygonal mirror to irradiate the light to the photoconductive drum 1 may be employed.

The developing device 10 may be an integral developing device including the photoconductive drum 1 and the developing roller 101. The developing device 10 may mix and agitate a developer, e.g., toner and a carrier. The housing 100 of the developing device 10 may be divided into an agitation chamber 110 and a development chamber 120. In the development chamber 120, an opening portion 105 communicating with the outside may be provided. A first agitator 140 may be installed in the agitation chamber 110. In the development chamber 120, the developing roller 101 and a second agitator 150 may be installed. The developing roller 101 may be partially exposed to the outside through the opening portion 105 and may be opposed to the photoconductive drum 1. The agitation chamber 110 and the development chamber 120 may be separated by a partition 130 extending in an axial direction of the developing roller 101. In both end portions in a longitudinal direction of the partition 130, i.e., in the axial direction of the developing roller 101, communication holes (not shown) may be provided respectively. The agitation chamber 110 and the development chamber 120 may be connected to each other by the communication holes. Each of the first and second agitators 140 and 150 may be an auger including a shaft extending in the axial direction of the developing roller 101 and a spiral wing formed on the outer circumference of the shaft. Based on the first agitator 140 being rotated, the developer inside the agitation chamber 110 may be transported in the axial direction by the first agitator 140, and may be transported to the development chamber 120 through an opening provided near an end portion of the partition 130. In the development chamber 120, the developer may be transported by the second agitator 150 in a direction opposite to a transport direction in the agitation chamber 110 and may be transported to the agitation chamber 110 through an opening provided near the other end portion of the partition 130. Thus, the developer may be circulated along the agitation chamber 110 and the development chamber 120 and may be supplied to the developing roller 101 positioned in the development chamber 120 in a circulation process.

The developing roller 101 may include a developing sleeve 102 supported rotatably on the housing 100, and a developing magnet 103 arranged fixedly inside the developing sleeve 102. The developing sleeve 102 may transport the developer including the toner and the carrier to a developing region 9 opposed to the photoconductive drum 1 through the opening portion 105. The toner may be attached to the carrier by an electrostatic force, and the carrier may be attached to the surface of the developing sleeve 102 by a magnetic force of the developing magnet 103. Thus, a developer layer may be formed on the surface of the developing sleeve 102. The developing sleeve 102 may be positioned apart from the photoconductive drum 1 by a developing gap. The developing gap may be set to several tens to several hundreds of micrometers. A thickness of the developer attached to the surface of the developing sleeve 102 may be regulated by a regulating member 104, and the developer may be transported to the developing region 9 through the opening portion 105. Toner may be moved to the photoconductive drum 1 from the developing sleeve 102 by a developing bias voltage applied between the developing sleeve 102 and the photoconductive drum 1, and a visible toner image may be formed on the surface of the photoconductive drum 1.

A transfer roller 4 is an example of a transfer unit to transfer the toner image formed on the photoconductive drum 1 to a print medium P. The transfer roller 4 may face the photoconductive drum 1 to form a transfer nip, and a transfer bias voltage may be applied to the transfer roller 4. The toner image developed on the surface of the photoconductive drum 1 may be transferred to the print medium P by a transfer electric field formed by the transfer bias voltage between the photoconductive drum 1 and the transfer roller 4. A corona transfer unit using corona discharging may be employed in place of the transfer roller 4. The toner image transferred to the print medium P may be attached to the print medium P by an electrostatic force. The fuser 7 may apply heat and pressure to fuse the toner image to the print medium P.

The image forming apparatus may include the toner cartridge 230. The toner cartridge 230 may be attached to and detached from the main body 300 of the image forming apparatus. An attachment/detachment direction of the toner cartridge 230 may be the first direction Z. For example, a mounting direction of the toner cartridge 230 may be the −Z direction and a removal direction of the toner cartridge 230 may be the +Z direction. A structure of the toner cartridge 230 may be the same as that described with reference to FIGS. 1 to 11.

Based on the toner in the developing device 10 being consumed, the toner may be supplied to the developing device 10 from the toner container 20 of the toner cartridge 230. The toner cartridge 230 may include the toner container 20 containing the toner and the toner outlet 24. The toner outlet 24 may be connected to a toner inlet 106 provided in the developing device 10. The toner inlet 106 may be connected to, for example, the agitation chamber 110. In the toner container 20, the toner transport members 25, 26, and 27 to transport the toner to the toner outlet 24 may be provided. Based on the toner cartridge 230 being mounted on the main body 300, the follower 29 provided in the second side portion 20-2 of the toner container 20 may be connected to the driving unit 301 provided in the main body 300. The toner transport members 25, 26, and 27 may be connected to the follower 29. The toner contained in the toner container 20 may be transported to the toner outlet 24 by the toner transport members 25, 26, and 27. Based on the toner contained in the toner container 20 being consumed, the toner cartridge 230 may be removed from the main body 300 and the new toner cartridge 230 may be mounted on the main body 300.

The toner cartridge 230 may include the waste toner container 32. The waste toner container 32 may be disposed in the first side portion 20-1 of the toner container 20. The waste toner removed from the photoconductive drum 1 may be contained in the waste toner container 32. For example, the waste toner removed from the photoconductive drum 1 may be transported in the first direction Z along a waste toner transporting path **6*b* by a waste toner transporting member 6*a*. The first direction Z may be, for example, the axial direction of the photoconductive drum 1. Based on the toner cartridge 230 being mounted on the main body 300, the waste toner transporting path 6*b* may be connected to the waste toner inlet 33 of the waste toner container 32. Based on the toner cartridge 230 being removed from the main body 300, the waste toner transporting path 6*b* may be separated from the waste toner inlet 33 of the waste toner container 32**.

The above-described dispersing members 34, **34*a*, and 34*b* may be driven by rotation power of any one of the toner transport members 25, 26, and 27, e.g., the toner transport member 26, transmitted by the driving transfer members 40, 40*a*, and 40*b*, and disperse the waste toner inside the waste toner container 32**.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. A toner cartridge comprising:

a toner container to contain toner, the toner container including a toner outlet;

a toner transport member comprising a rotation shaft extending in a first direction and arranged in the toner container to transport the toner to the toner outlet by rotating with respect to the rotation shaft in the first direction;

a waste toner container including a waste toner inlet to receive waste toner, the waste toner inlet arranged in a side portion of the toner container in the first direction;

a dispersing member arranged inside the waste toner container to transport the waste toner in a second direction to disperse the waste toner inside the waste toner container, wherein the dispersing member may extend in the second direction and may include a body extending in the second direction to stir the waste toner in the second direction; and a driving transfer member to receive rotation power from the toner transport member to transfer into the movement of the dispersing member in the second direction that is orthogonal to the first direction, wherein the driving transfer member may reciprocate the dispersing member in the second direction to enable the dispersing member to move back and forth along a length of the waste toner container, wherein the dispersing member comprises a sliding groove extending in a third direction that is orthogonal to the first direction and the second direction, and wherein the driving transfer member comprises:

a rotating member to rotate with respect to a rotation shaft in the first direction, the rotating member including an eccentric pin positioned to deviate from the rotation shaft and inserted into the sliding groove; and at least one gear to connect the rotating member to the toner transport member.

2. The toner cartridge of claim 1, wherein the dispersing member comprises a cam contact portion extending in a third direction that is orthogonal to the first direction and the second direction, and wherein the driving transfer member comprises:

a rotation cam including an eccentric protrusion;

at least one gear to connect the rotation cam to the toner transport member; and a first elastic member to apply an elastic force to the dispersing member such that the cam contact portion contacts the eccentric protrusion.

3. The toner cartridge of claim 1, further comprising a vibration driving unit to vibrate the dispersing member in the first direction in conjunction with reciprocation of the dispersing member in the second direction.

4. The toner cartridge of claim 3, wherein the vibration driving unit comprises:

first and second slope portions provided in either of the dispersing member and the waste toner container, to extend in the second direction, and to be inclined in the first direction, and symmetric with respect to the second direction and the first direction; and first and second contact portions to contact the first and second slope portions, respectively, and provided in the other of the dispersing member and the waste toner container.

5. The toner cartridge of claim 1, wherein the toner container comprises:

a first side portion and a second side portion in the first direction; and a follower, provided in the second side portion, to drive the toner transport member, wherein the waste toner container is located in the first side portion.

6. A toner cartridge comprising:

a toner container to contain toner, the toner container including a toner outlet;

a toner transport member comprising a rotation shaft extending in a first direction and arranged in the toner container to transport the toner to the toner outlet by rotating with respect to the rotation shaft in the first direction;

a waste toner container including a waste toner inlet to receive waste toner, the waste toner inlet arranged in a side portion of the toner container in the first direction;

a dispersing member arranged inside the waste toner container to transport the waste toner in a second direction to disperse the waste toner inside the waste toner container, wherein the dispersing member may extend in the second direction and may include a body extending in the second direction to stir the waste toner in the second direction;

a driving transfer member to receive rotation power from the toner transport member to transfer into the movement of the dispersing member in the second direction that is orthogonal to the first direction, wherein the driving transfer member may reciprocate the dispersing member in the second direction to enable the dispersing member to move back and forth along a length of the waste toner container;

a vibration driving unit comprising:

a slope portion, extending in the first direction and including a slope in the second direction, provided in either of the dispersing member and the waste toner container;

a contact portion provided to contact the slope portion in the other of the dispersing member and the waste toner container; and an elastic member to apply an elastic force to the dispersing member such that the slope portion and the contact portion contact each other, wherein the vibration driving unit may vibrate the dispersing member in the first direction in conjunction with reciprocation of the dispersing member in the second direction.

7. A toner cartridge comprising:

a toner container to contain toner, the toner container including a toner outlet;

a toner transport member comprising a rotation shaft extending in a first direction and arranged in the toner container to transport the toner to the toner outlet by rotating with respect to the rotation shaft in the first direction;

a waste toner container including a waste toner inlet to receive waste toner, the waste toner inlet arranged in a side portion of the toner container in the first direction;

a dispersing member arranged inside the waste toner container, wherein the dispersing member comprises a rotation shaft extending in a second direction that is orthogonal to the first direction and a spiral wing formed on the rotation shaft to transport the waste toner in the second direction to disperse the waste toner inside the waste toner container; and a driving transfer member to receive rotation power from the toner transport member, wherein the driving transfer member is to convert rotation power of the toner transport member with respect to an axis in the first direction into rotation power with respect to an axis in the second direction and transfers the rotation power to the dispersing member.

8. An image forming apparatus comprising:

a main body including a developing device to supply toner to an electrostatic latent image formed on a photoconductor and to develop the electrostatic latent image; and a toner cartridge to contain toner to be supplied to the developing device, wherein the toner cartridge comprises:

a toner container to contain the toner, the toner container including a toner outlet;

a toner transport member comprising a rotation shaft extending in the first direction and arranged in the toner container to transport the toner to the toner outlet by rotating with respect to the rotation shaft in the first direction;

a waste toner container including a waste toner inlet to receive waste toner, the waste toner inlet arranged in a side portion of the toner container in the first direction;

a dispersing member arranged inside the waste toner container to transport the waste toner in a second direction to disperse the waste toner inside the waste toner container, wherein the dispersing member may extend in the second direction and may include a body extending in the second direction to stir the waste toner in the second direction; and a driving transfer member to receive rotation power from the toner transport member to transfer into the movement of the dispersing member in the second direction that is orthogonal to the first direction, wherein the driving transfer member may reciprocate the dispersing member in the second direction to enable the dispersing member to move back and forth along a length of the waste toner container, wherein the dispersing member comprises a sliding groove extending in a third direction that is orthogonal to the first direction and the second direction, and wherein the driving transfer member comprises:

a rotating member to rotate with respect to a rotation shaft in the first direction, the rotating member including an eccentric pin positioned to deviate from the rotation shaft and inserted into the sliding groove; and at least one gear to connect the rotating member to the toner transport member.

9. The image forming apparatus of claim 8, wherein the toner container comprises:

a first side portion; and a follower provided in the first side portion and connected to a driving unit provided on the main body to drive the toner transport member.

10. The image forming apparatus of claim 8, further comprising a vibration driving unit to vibrate the dispersing member in the first direction in conjunction with reciprocation of the dispersing member in the second direction.

11. The image forming apparatus of claim 8, wherein the dispersing member comprises a rotation shaft extending in the second direction and a spiral wing formed on the rotation shaft, and wherein the driving transfer member is to convert rotation power of the toner transport member with respect to an axis in the first direction into rotation power with respect to an axis in the second direction and transfer the rotation power to the dispersing member.

* * * * *